(12) United States Patent
Tsai

(10) Patent No.: US 8,677,912 B1
(45) Date of Patent: Mar. 25, 2014

(54) FOLDABLE TABLE

(71) Applicant: Ping-Cheng Tsai, Shenzhen (CN)

(72) Inventor: Ping-Cheng Tsai, Shenzhen (CN)

( * ) Notice: Subject to any disclaimer, the term of this patent is extended or adjusted under 35 U.S.C. 154(b) by 0 days.

(21) Appl. No.: 13/694,182

(22) Filed: Nov. 1, 2012

(51) Int. Cl.
*A47B 3/00* (2006.01)

(52) U.S. Cl.
USPC ......................................................... 108/132

(58) Field of Classification Search
USPC .......... 108/129, 132, 171, 172, 173, 174, 115, 108/35, 36, 167, 168, 169; 248/188.6, 439
See application file for complete search history.

(56) References Cited

U.S. PATENT DOCUMENTS

| | | | | |
|---|---|---|---|---|
| 6,058,853 | A * | 5/2000 | Pinch ............................ | 108/129 |
| 7,278,361 | B2 * | 10/2007 | Zhurong et al. .............. | 108/168 |
| 7,475,641 | B2 * | 1/2009 | Jin ................................ | 108/132 |
| 7,634,969 | B2 * | 12/2009 | Neunzert et al. ............. | 108/132 |
| 7,640,870 | B2 * | 1/2010 | Strong et al. ................. | 108/132 |
| 8,225,725 | B2 * | 7/2012 | Voris ............................. | 108/132 |
| 8,261,676 | B2 * | 9/2012 | VanNimwegen et al. ..... | 108/125 |
| 2002/0092445 | A1 * | 7/2002 | Glover et al. ................. | 108/129 |
| 2005/0061214 | A1 * | 3/2005 | Tsai ............................... | 108/132 |
| 2005/0155534 | A1 * | 7/2005 | Lin et al. ....................... | 108/132 |
| 2008/0216719 | A1 * | 9/2008 | Larcom et al. ................ | 108/132 |
| 2011/0017109 | A1 * | 1/2011 | Stanford ....................... | 108/132 |

* cited by examiner

*Primary Examiner* — Jose V Chen
(74) *Attorney, Agent, or Firm* — Raymond Y. Chan; David and Raymond Patent Firm

(57) ABSTRACT

A foldable table includes a first tabletop panel, a second tabletop panel, a first peripheral edge rim, a second peripheral edge rim, and a foldable frame. The foldable frame includes a reinforcing frame which includes first through fourth elongated reinforcing member spacedly mounted along two longitudinal sides of the first receiving cavity and the second receiving cavity respectively, a first and a second leg frame pivotally mounted on the first receiving cavity and the second receiving cavity respectively, and a hinge arrangement. The hinge arrangement includes a first connecting joint, a second connecting joint, and a first and a second locker device coupled to the first connecting joint and the second connecting joint respectively, wherein the first locker device and the second locker device are arranged to operate between a locked position and an unlock position.

17 Claims, 7 Drawing Sheets

FOLDABLE TABLE

BACKGROUND OF THE PRESENT INVENTION

1. Field of Invention

The present invention relates to a table, and more particularly to a foldable table which is equipped with a reinforcing frame for substantially strengthening a structural integrity of the foldable table, and a hinge arrangement for selectively and conveniently folding and unfolding a tabletop of the foldable table.

2. Description of Related Arts

A conventional foldable table usually comprises a tabletop and a supporting frame which comprises a tabletop reinforcing frame and a foldable leg frame connected thereunder in a pivotally foldable manner. When the foldable table is in use, the leg frame is pivotally unfolded and extended to support the tabletop at an elevated height, and when the foldable table is not in use, the leg frame is capable of being folded towards the tabletop for reduction in its overall size so as to facilitate easy storage and transportation.

Conventionally, most of the improvements for conventional foldable tables have been overwhelmingly concentrated on the leg frame. Persons skill in the art have devoted themselves in developing new kinds of leg frames and the foldable mechanism in order to make the foldable table easier to fold, more compact in size and more secure in structure.

On the other hand, however, it has been recognized that the tabletop may also be designed to reduce an overall size of the foldable table (e.g. by making the tabletop foldable). Although it is conceived that by altering the structure of the tabletop, the overall stability and security of the foldable table may be substantially deteriorated, this disadvantage should be carefully tackled so as to develop an optimal foldable table which is both compact in size and secure in structure.

SUMMARY OF THE PRESENT INVENTION

The invention is advantageous in that it provides a foldable table which is equipped with a reinforcing frame for substantially strengthening a structural integrity of the foldable table, and a hinge arrangement for selectively and conveniently folding and unfolding a tabletop of the foldable table.

Another advantage of the invention is to provide a foldable table which comprises a foldable frame which is capable of supporting a tabletop in a foldably movable manner without affecting the stability of the foldable table.

Another advantage of the invention is to provide a foldable table which comprises a hinge arrangement comprising a pivot pin pivotally connecting a two connecting joints for facilitating folding motions between two tabletop panels.

Another advantage of the invention is to provide a foldable table comprising a foldable frame which does not involve complicated and expensive mechanical components and processes so that the manufacturing cost of the present invention can be minimized.

Additional advantages and features of the invention will become apparent from the description which follows, and may be realized by means of the instrumentalities and combinations particular point out in the appended claims.

According to the present invention, the foregoing and other objects and advantages are attained by providing a foldable table, comprising:

a tabletop, which comprises:
a first tabletop panel;
a second tabletop panel;
a first peripheral edge rim downwardly and peripherally extended from the first tabletop panel to define a first receiving cavity within a bottom surface of the first tabletop panel and the first peripheral edge rim; and
a second peripheral edge rim downwardly and peripherally extended from the second tabletop panel to define a second receiving cavity within a bottom surface of the second tabletop panel and the second peripheral edge rim; and
a foldable frame, which comprises:
a reinforcing frame which comprises first through fourth elongated reinforcing member spacedly mounted along two longitudinal sides of the first receiving cavity and the second receiving cavity respectively;
a first and a second leg frame pivotally mounted on the first receiving cavity and the second receiving cavity respectively; and
a hinge arrangement, which comprises:
a first connecting joint provided between inner ends of the first and third elongated reinforcing member respectively for allowing the first elongated reinforcing member and the third elongated reinforcing member to pivotally fold and unfold with respect to each other;
a second connecting joint provided between inner ends of the second and fourth elongated reinforcing member respectively for allowing the second elongated reinforcing member and the fourth elongated reinforcing member to pivotally fold and unfold with respect to each other; and
a first and a second locker device coupled to the first connecting joint and the second connecting joint respectively, wherein the first locker device and the second locker device are arranged to operate between a locked position and an unlock position, wherein in the locked position, the first locker device and the second locker device are arranged to lock up pivotal movements of the first connecting joint and the second connecting joint, wherein in the unlocked position, the first locker device and the second locker device are arranged to unlock the pivotal movements of the first connecting joint and the second connecting joint so as to allow the first tabletop panel to fold and unfold with respect to the second tabletop panel.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
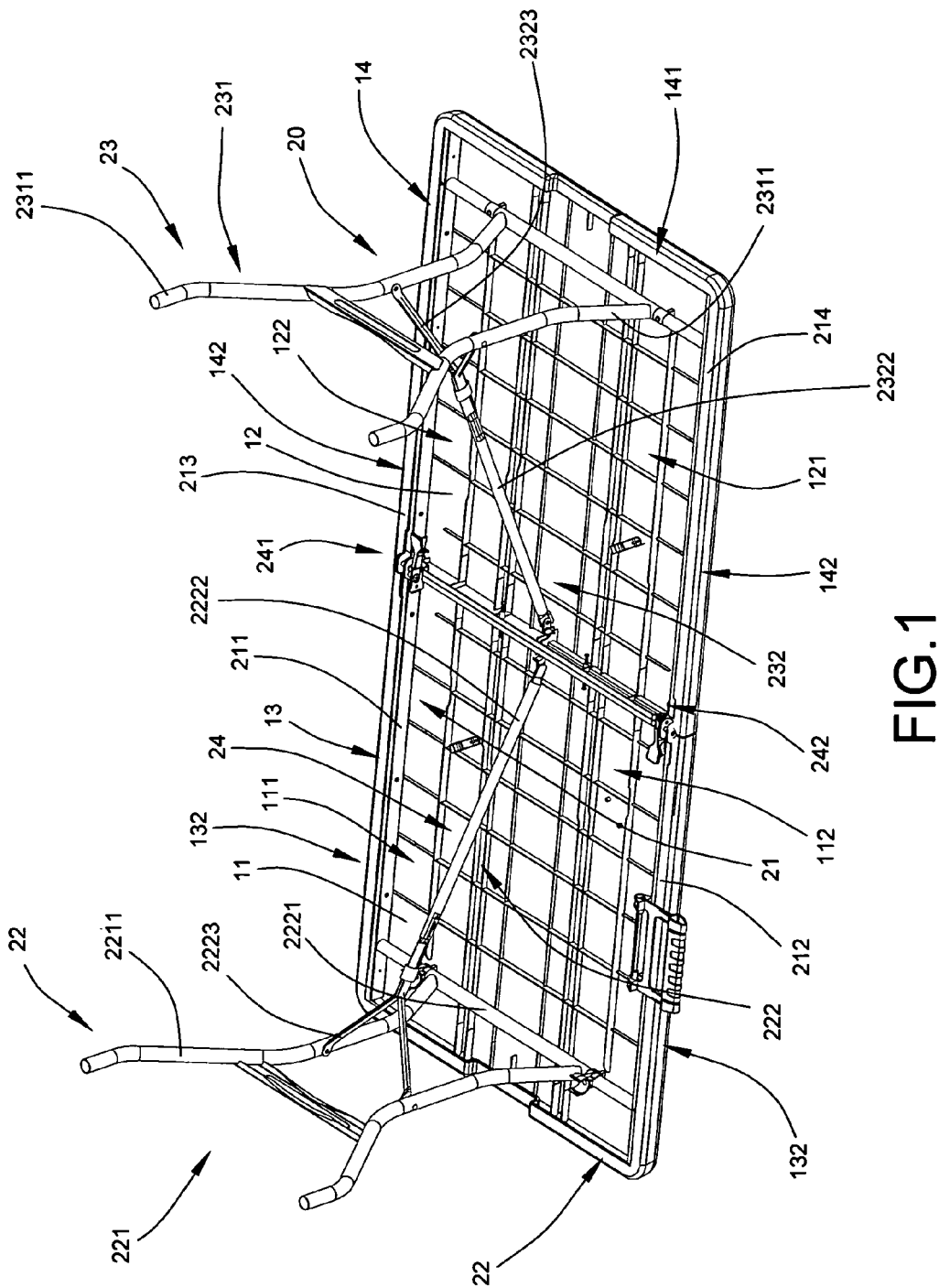
FIG. 1 is a perspective view of a foldable table according to a preferred embodiment of the present invention.

Referring to FIG. 1 to FIG. 7 of the drawings, a foldable table according to a preferred embodiment of the present invention is illustrated, in which the foldable table comprises a tabletop 10, and a foldable frame 20.

The tabletop 10 comprises a first tabletop panel 11, a second tabletop panel 12, a first peripheral edge rim 13 and a second peripheral edge rim 14. On the other hand, the foldable frame 20 comprises a reinforcing frame 21, a first leg frame 22, a second leg frame 23 and a hinge arrangement 24.

The first peripheral edge rim 13 is downwardly and integrally extended from the first tabletop panel 11 to define a first receiving cavity 111 within a bottom surface 112 of the first tabletop panel 11 and the first peripheral edge rim 13.

The second peripheral edge rim 14 is downwardly and integrally extended from the second tabletop panel 12 to define a second receiving cavity 121 within a bottom surface 122 of the second tabletop panel 12 and the second peripheral edge rim 14.

The reinforcing frame 21 comprises first through fourth elongated reinforcing member 211, 212, 213, 214 spacedly mounted along two longitudinal sides of the first receiving cavity 111 and the second receiving cavity 121 respectively.

The first and the second leg frame 22, 23 are pivotally mounted on the first receiving cavity 111 and the second receiving cavity 121 respectively. On the other hand, the hinge arrangement 24 comprises a first connecting joint 241, a second connecting joint 242, a first locker device 243, and a second locker device 244.

The first connecting joint 241 is provided between inner ends of the first and third elongated reinforcing member 211, 213 respectively for allowing the first elongated reinforcing member 211 and the third elongated reinforcing member 213 to pivotally fold and unfold with respect to each other.

Moreover, the second connecting joint 242 is provided between inner ends of the second and fourth elongated reinforcing member 212, 214 respectively for allowing the second elongated reinforcing member 212 and the fourth elongated reinforcing member 214 to pivotally fold and unfold with respect to each other.

On the other hand, the first and a second locker device 243, 244 are coupled to the first connecting joint 241 and the second connecting joint 242 respectively, wherein the first locker device 243 and the second locker device 244 are arranged to operate between a locked position and an unlock position, wherein in the locked position, the first locker device 243 and the second locker device 244 are arranged to lock up pivotal movements of the first connecting joint 241 and the second connecting joint 242, wherein in the unlocked position, the first locker device 243 and the second locker device 244 are arranged to unlock the pivotal movements of the first connecting joint 241 and the second connecting joint 242 so as to allow the first tabletop panel 11 to fold and unfold with respect to the second tabletop panel 12.

According to the preferred embodiment of the present invention, the first tabletop panel 11 and the second tabletop panel 12 are made of plastic material and are preferably formed by injection molding. Other manufacturing method is feasible but injection molding is the preferred mode of manufacturing method of the present invention. Moreover, each of the first tabletop panel 11 and the second tabletop panel 12 is rectangular in cross-sectional shape so that when they are foldably connected by the foldable frame 20, the entire foldable table has a rectangular cross sectional shape as well.

The first peripheral edge rim 13 and the second peripheral edge rim 14 are integrally extended from the first tabletop panel 11 and the second tabletop panel 12 respectively for forming the first receiving cavity 111 and the second receiving cavity 121. In this preferred embodiment, each of the first peripheral edge rim 13 and the second peripheral edge rim 14 is extended from a corresponding outer transverse edge and two longitudinal edges of the first tabletop panel 11 and the second tabletop panel 12 respectively. In other words, each of the first peripheral edge rim 13 and the second peripheral edge rim 14 form a U-shaped cross section with viewed from the bottom side of the foldable table.

Thus, the first peripheral rim 13 has a first transversely extending portion 131 and two first longitudinally extending portion 132, while second peripheral rim 14 has a second transversely extending portion 141 and two second longitudinally extending portion 142.

The first and the second elongated reinforcing member 211, 212 are extended along first longitudinally extending portions 132 of the first peripheral rim 13 respectively, while the third and the fourth elongated reinforcing member 213, 214 are extended along the longitudinally extending portions 142 of the second peripheral edge rim 14.

On the other hand, the first leg frame 22 comprises a first supporting leg 221 having two first leg members 2211 pivotally connected to the first and the second elongated reinforcing member 211, 212, and a first connecting frame 222 foldably connected between the first tabletop panel 11 and the first supporting leg 221 in such a manner that the first supporting leg 221 is capable of selectively and pivotally folding toward and unfolding from the first tabletop panel 11 through the first connecting frame 222.

Similarly, the second leg frame 23 comprises a second supporting leg 231 having two second leg members 2311 pivotally connected to the third and the fourth elongated reinforcing member 213, 214, and a second connecting frame 232 foldably connected between the second tabletop panel 12 and the second supporting leg 231 in such a manner that the second supporting leg 231 is capable of selectively and pivotally folding toward and unfolding from the second tabletop panel 12 through the second connecting frame 232.

More specifically, the first connecting frame 222 comprises a first folding rod 2221 transversely extended between two inner end portions of the first reinforcing member 211 and the second reinforcing member 212 in the first receiving cavity 111, a first pivotal connecting shaft 2222 having one end pivotally extended from a mid portion of the first folding rod 2221, and a plurality of first elongated folding rods 2223 each having one end pivotally connected to the first leg members 2211 respectively, and another end pivotally coupled with another end of the first pivotal connecting shaft 2222. As shown in FIG. 1 of the drawings, when the elongated folding rods 2223 are pivotally folded with respect to the first pivotal connecting shaft 2222, the first supporting leg 221 is capable of folding and unfolding toward the first tabletop panel 11.

The second connecting frame 232 comprises a second folding rod 2321 transversely extended between two inner end portions of the third reinforcing member 213 and the fourth reinforcing member 214 in the second receiving cavity 121, a second pivotal connecting shaft 2322 having one end pivotally extended from a mid portion of the second folding rod 2321, and a plurality of second elongated folding rods 2323 each having one end pivotally connected to the second leg members 2311 respectively, and another end pivotally coupled with another end of the second pivotal connecting shaft 2322. Also as shown in FIG. 1 of the drawings, when the elongated folding rods 2323 are pivotally folded with respect to the second pivotal connecting shaft 2322, the second supporting leg 231 is capable of folding and unfolding toward the second tabletop panel 12.

In other words, the first connecting frame 222 and the second connecting frame 232 are capable of facilitating folding and unfolding of the first leg frame 22 and the second leg frame 23. When the first leg frame 22 and the second leg frame 23 are folded toward the first and the second tabletop panel 11, 12, the entire foldable table can be reduced to a compact size.

Figure 4:
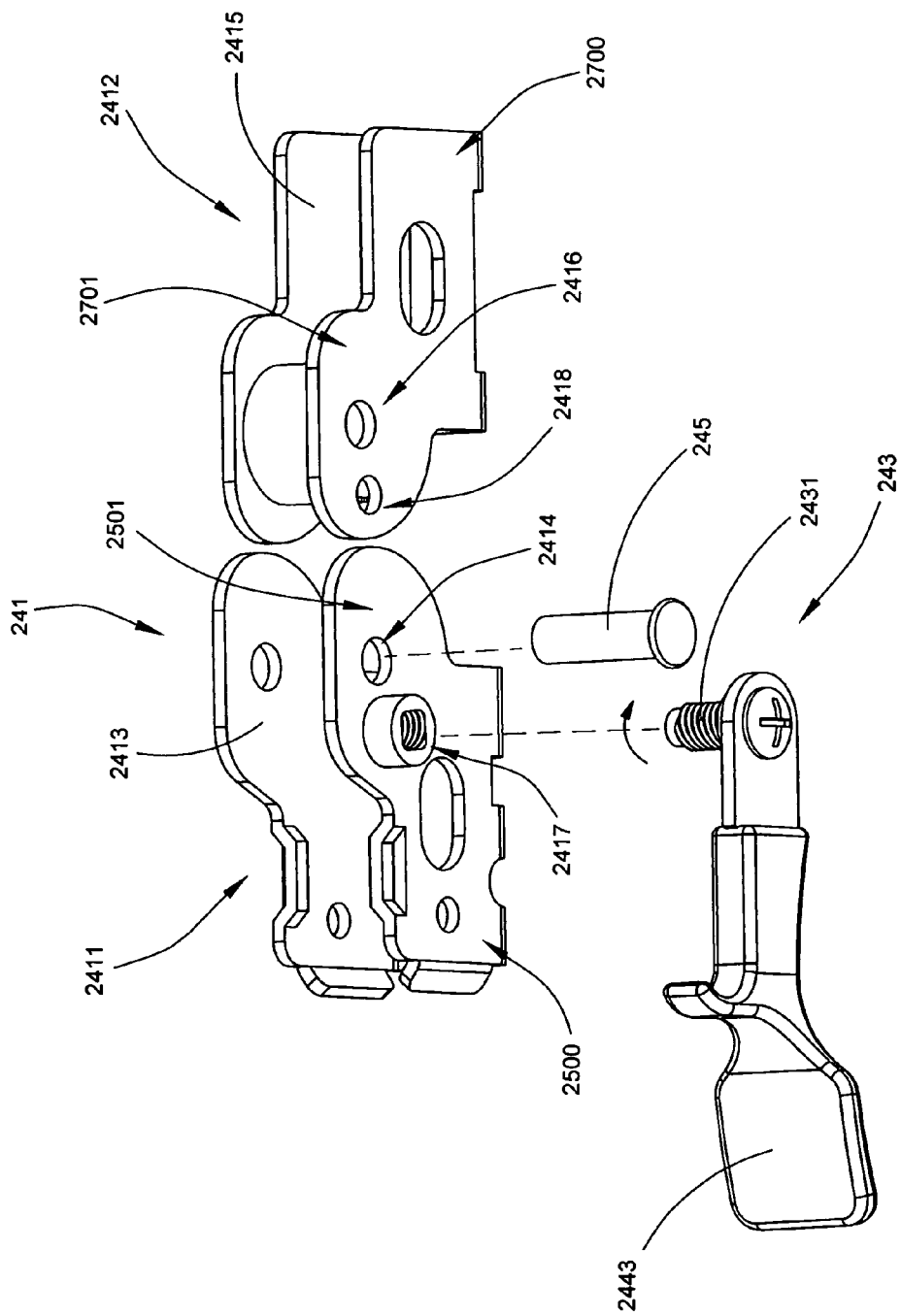
FIG. 4 is a perspective view of a connecting joint of the foldable table according to the above preferred embodiment of the present invention.
Figure 5:
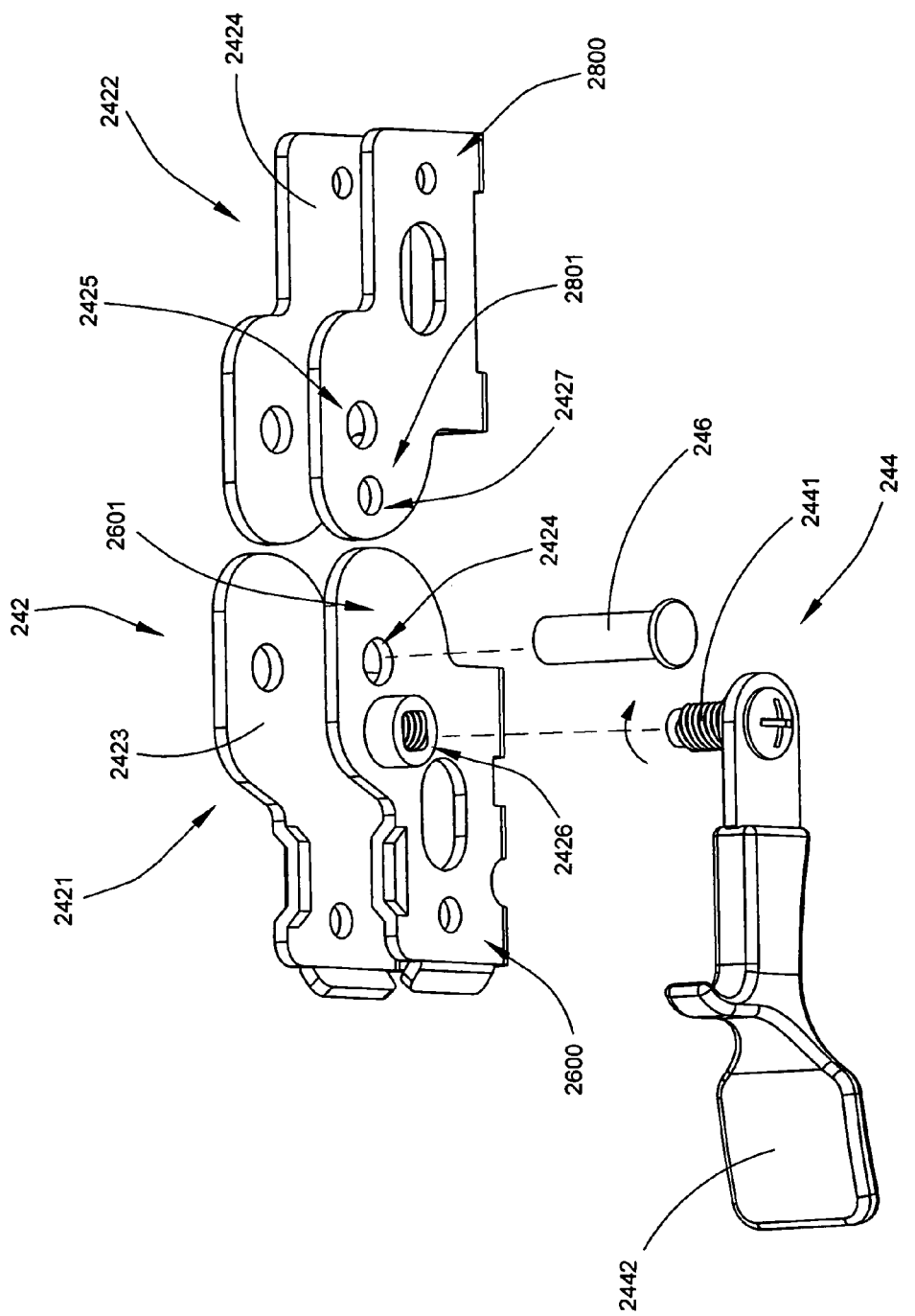
FIG. 5 is an exploded perspective view of the connecting joint of the foldable table according to the above preferred embodiment of the present invention.
Figure 6:
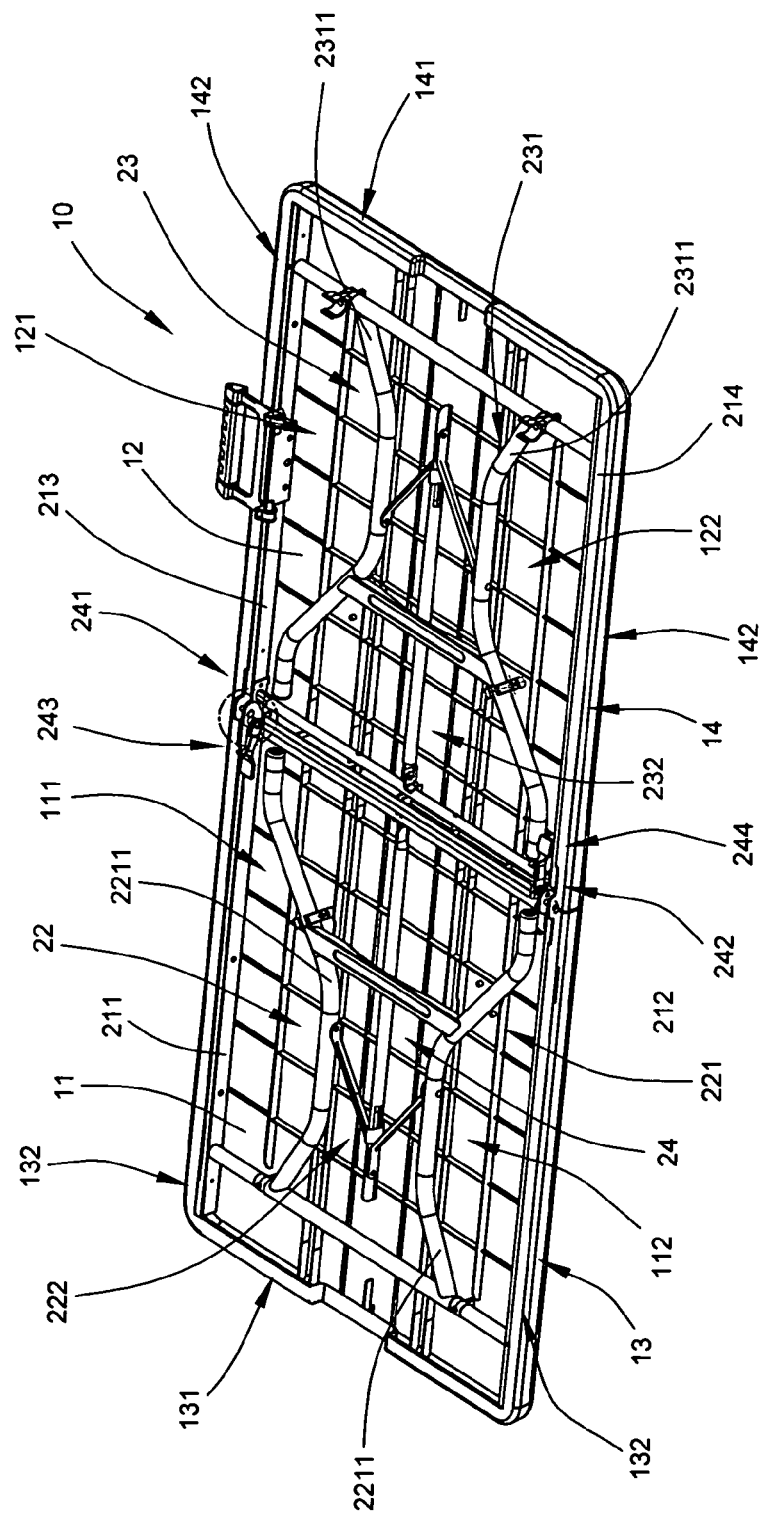
FIG. 6 is a perspective view of the foldable table according to the above preferred embodiment of the present invention, illustrating one of the locker devices.
Figure 7:
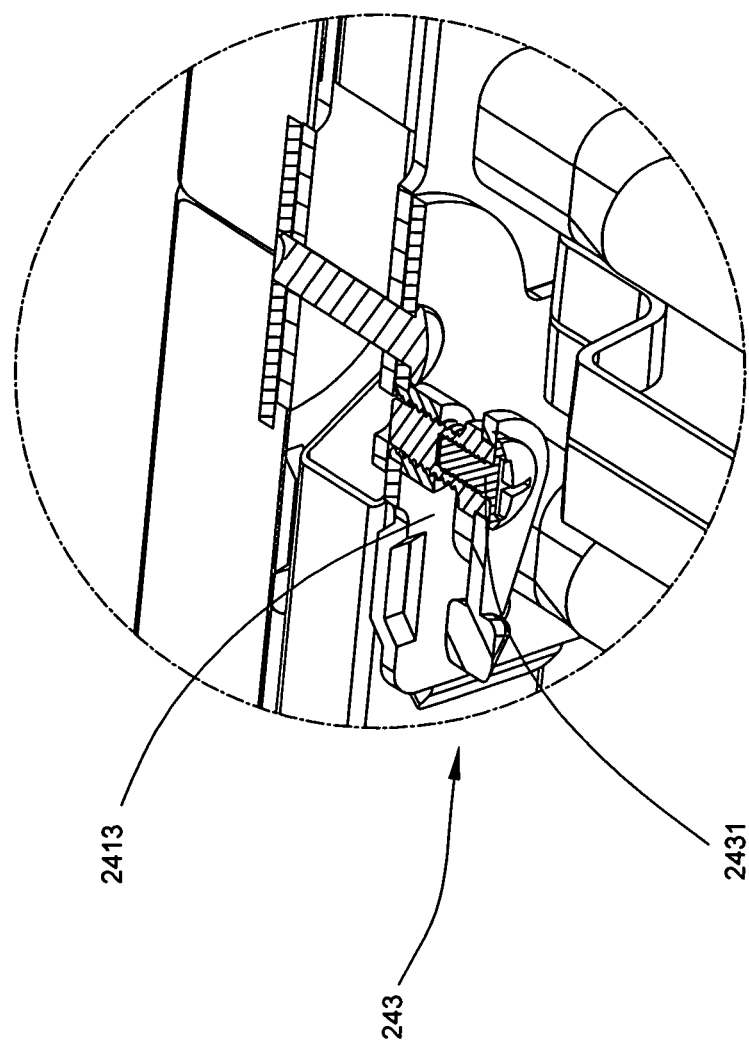
FIG. 7 is a schematic diagram of one of the locker devices according to the above preferred embodiment of the present invention.

Referring to FIG. 4 to FIG. 5 of the drawings, the hinge arrangement 24 comprises the first connecting joint 241, the second connecting joint 242, the first locker device 243, and the second locker device 244. According to the preferred embodiment of the present invention, the first connecting joint 241 comprises a first joint member 2411 and a third joint member 2412 coupled to the inner end of the first elongated reinforcing member 211 and the third elongated reinforcing member 213 respectively. The first joint member 2411 comprises a plurality of first connecting panels 2413 spacedly mounted to the first elongated reinforcing member 211, wherein each of the first connecting panels 2413 has a first pivot hole 2414 alignedly formed thereon. Moreover, the hinge arrangement 24 further comprises a first pivot pin 245 arranged to penetrate the first pivot holes 2414 formed on the first connecting panels 2413.

On the other hand, the third joint member 2412 is coupled to the inner end of the third elongated reinforcing member 213. The third joint member 2412 comprises a plurality of third connecting panels 2415 spacedly mounted to the third elongated reinforcing member 213, wherein each of the third connecting panels 2415 has a third pivot hole 2416 alignedly formed thereon. As shown in FIG. 4 of the drawings, the first connecting panels 2413 are arranged to overlap with the third connecting panels 2415 at the space formed between the first connecting panels 2413 and the third connecting panels 2415, wherein the first pivot pin 245 is arranged to penetrate the first pivot holes 2414 and the third pivot holes 2416 so that the first joint member 2411 and the third joint member 2413 can be pivotally folded and unfolded with respect to each other.

Similarly, as shown in FIG. 5 of the drawings, the second connecting joint 242 comprises a second joint member 2421 and a fourth joint member 2422 coupled to the inner end of the second elongated reinforcing member 212 and the fourth elongated reinforcing member 214 respectively. The second joint member 2421 comprises a plurality of second connecting panels 2423 spacedly mounted to the second elongated reinforcing member 212, wherein each of the second connecting panels 2423 has a second pivot hole 2424 alignedly formed thereon. Moreover, the hinge arrangement 24 further comprises a second pivot pin 246 arranged to penetrate the second pivot holes 2424 formed on the second connecting panels 2423.

On the other hand, the fourth joint member 2422 is coupled to the inner end of the fourth elongated reinforcing member 214. The fourth joint member 2422 comprises a plurality of fourth connecting panels 2424 spacedly mounted to the fourth elongated reinforcing member 214, wherein each of the fourth connecting panels 2422 has a fourth pivot hole 2425 alignedly formed thereon. As shown in FIG. 5 of the drawings, the second connecting panels 2423 are arranged to overlap with the fourth connecting panels 2424 at the space formed between the second connecting panels 2423 and the fourth connecting panels 2422, wherein the second pivot pin 246 is arranged to penetrate the second pivot holes 2424 and the fourth pivot holes 2425 so that the second joint member 2421 and the fourth joint member 2422 can be pivotally folded and unfolded with respect to each other.

It is worth mentioning that the first pivot pin 245 and the second pivot pin 246 are rigid and may be embodied as having a wide variety of cross sectional shapes so as to ensure sound stability of the hinge arrangement 24. Moreover, the first pivot pin 245 and the second pivot pin 246 can be made of a wide variety of materials so as to accommodate different manufacturing and marketing needs.

Each of the first connecting panels 2413 has a first base portion 2500 coupled to the first elongated reinforcing member 211 and a first head portion 2501 upwardly and inwardly extended from the first base portion 2500, wherein the first pivot hole 2414 is formed on the first head portion 2502. Similarly, each of the third connecting panels 2415 has a third base portion 2700 coupled to the third elongated reinforcing member 213 and a third head portion 2701 upwardly and inwardly extended from the third base portion 2500, wherein the third pivot hole 2416 is formed on the third head portion 2701.

Each of the second connecting panels 2423 has a second base portion 2600 coupled to the second elongated reinforcing member 212 and a second head portion 2601 upwardly and inwardly extended from the second base portion 2600, wherein the second pivot hole 2424 is formed on the second head portion 2601. Finally, each of the fourth connecting panels 2424 has a fourth base portion 2800 coupled to the fourth elongated reinforcing member 214 and a fourth head portion 2801 upwardly and inwardly extended from the fourth base portion 2800, wherein the fourth pivot hole 2425 is formed on the fourth head portion 2801.

From the forgoing descriptions, it can be shown that the first tabletop panel 11 and the second tabletop panel 12 can be selectively folded and unfolded through hinge arrangement 24 of the foldable frame 20. Moreover, as mentioned earlier, the first leg frame 22 and the second leg frame 23 can also be folded and unfolded with respect to the first tabletop panel 11 and the second tabletop panel 12 respectively.

Referring to FIG. 4 to FIG. 8 of the drawings, the first locker device 243 comprises a first locker pin 2431 and a first locker handle 2432 extended from the first locker pin 2431, wherein the first locker pin 2431 is arranged to selectively penetrate one of the first connecting panels 2413 and the corresponding third connecting panel 2415 for restricting the relative pivotal movement between the corresponding first joint member 2411 and the third joint member 2412. Accordingly, the first joint member 2411 further has a first locker hole 2417 formed on one of the first connecting panels 2413 while the third joint member 2412 further has a third locker hole 2418 formed on the corresponding third connecting panel 2415, wherein the first locker hole 2417 and the third locker hole 2418 are aligned with each other so that the first locker pin 2431 is arranged to rotatably penetrate the first locker hole 2417 and the third locker hole 2418 for selectively locking the first joint member 2411 and the third joint member 2412. Note that the rotational movement of the first locker pin 2431 is actuated by a movement of the locker handle 2432.

On the other hand, the second locker device 244 comprises a second locker pin 2441 and a second locker handle 2442 extended from the second locker pin 2441, wherein the second locker pin 2441 is arranged to selectively penetrate one of the second connecting panels 2423 and the corresponding fourth connecting panel 2424 for restricting the relative pivotal movement between the corresponding second joint member 2421 and the fourth joint member 2422. Accordingly, the second joint member 2421 further has a second locker hole 2426 formed on one of the second connecting panels 2423 while the fourth joint member 2422 further has a fourth locker hole 2427 formed on the corresponding fourth connecting panel 2424, wherein the second locker hole 2426 and the fourth locker hole 2427 are aligned with each other so that the second locker pin 2441 is arranged to rotatably penetrate the second locker hole 2426 and the fourth locker hole 2427 for selectively locking the second joint member 2421 and the fourth joint member 2422. Note that the rotational movement of the second locker pin 2441 is actuated by a movement of the second locker handle 2442.

Figure 2:
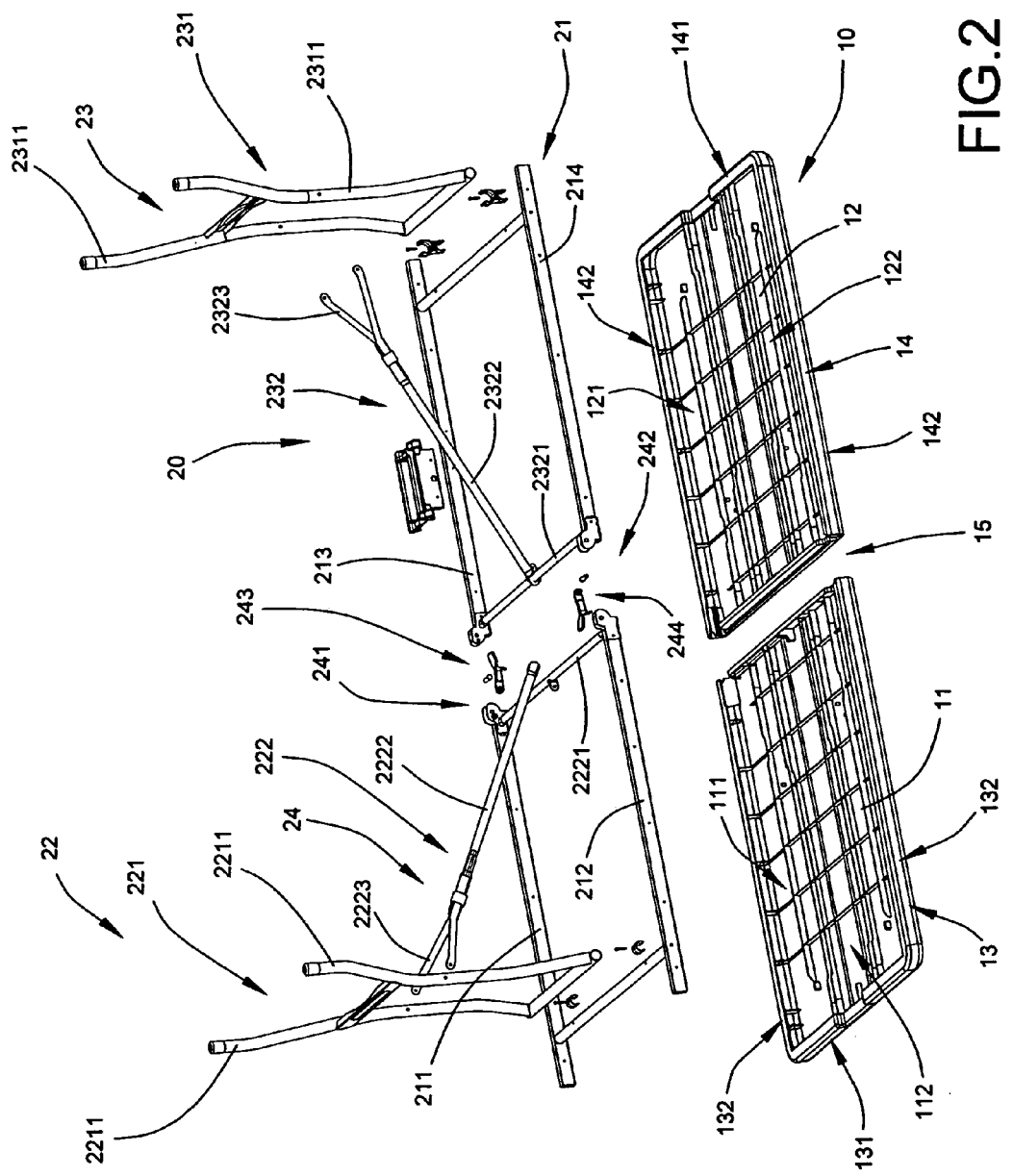
FIG. 2 is an exploded perspective view of the foldable table according to the above preferred embodiment of the present invention.
Figure 3:
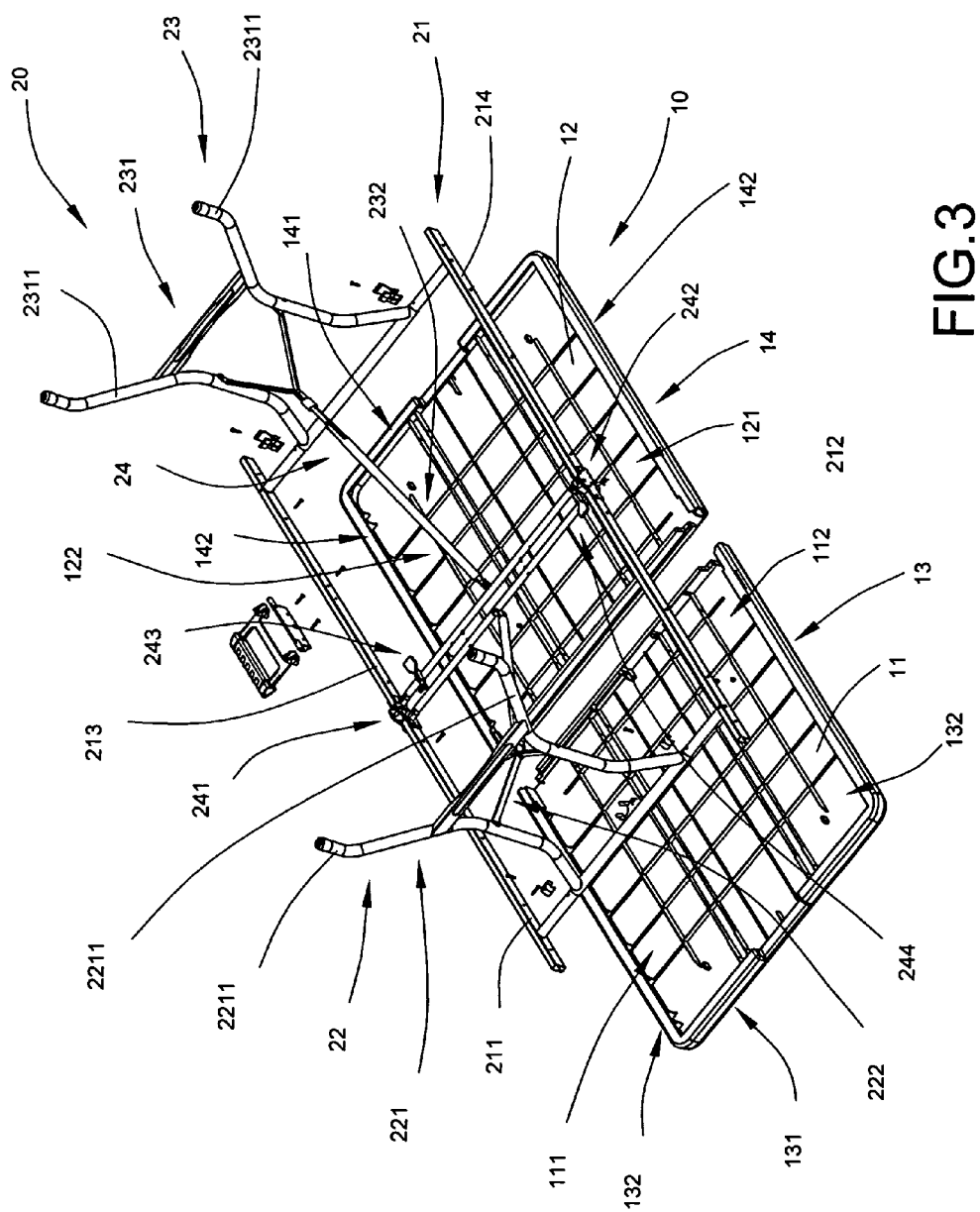
FIG. 3 is a schematic diagram of the foldable table according to the above preferred embodiment of the present invention.

Referring to FIG. 2 of the drawings, the tabletop 10 further comprises an engagement mechanism 15 provided on an inner side of the first and the second tabletop panel 11, 12 for facilitating easy folding and unfolding of the tabletop 10 while maintaining the stability thereof. More specifically, the engagement mechanism 15 comprises a first engaging member 151 and a second engaging member 152 provided on an inner side edge of the first tabletop panel 11 and the second tabletop panel 12 respectively, wherein the first engaging member 151 is arranged to be detachably engaged with the second engaging member 152.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable table, comprising:
   a tabletop which comprises a first tabletop panel and a second tabletop panel;
   a foldable frame, which comprises:
   a reinforcing frame which comprises first and third reinforcing members spacedly mounted along two longitudinal sides of said first tabletop panel at a bottom surface thereof, and second and fourth reinforcing members spacedly mounted along two longitudinal sides of said second tabletop panel at a bottom surface thereof;
   first and second leg frames pivotally mounted said bottom surfaces of said first and second tabletop panels respectively; and
   a hinge arrangement, which comprises:
   a first connecting joint comprising a first pivot pin, a first joint member coupled to an inner end of said first reinforcing member and a third joint member coupled to an inner end of said third reinforcing member, wherein said first joint member has a first pivot hole, wherein said third joint member has a third pivot hole, wherein said first and third pivot holes are aligned that said first pivot pin penetrates through said first and third pivot holes to pivotally couple said first and third joint members, wherein said first and third joint members are pivotally coupled to pivotally couple said inner ends of said first and third reinforcing members;
   a second connecting joint comprising a second pivot pin, a second joint member coupled to an inner end of said second reinforcing member and a fourth joint member coupled to an inner end of said fourth reinforcing member, wherein said second joint member has a second pivot hole, wherein said fourth joint member has a fourth pivot hole, wherein said second and fourth pivot holes are aligned that said second pivot pin penetrates through said second and fourth pivot holes to pivotally couple said second and fourth joint members, wherein said second and fourth joint members are pivotally coupled to pivotally couple said inner ends of said second and fourth reinforcing members;
   a first locker device coupled to said first connecting joint, wherein said first locker device has a first locker hole formed at said first joint member and a third locker hole formed at said third joint member, wherein said first locker device further comprises a first locker handle and a first locker pin extended from said first locker handle and arranged in such a manner that when said first and third joint members are pivotally moved to align said first locker hole with said third locker hole, said first locker handle is rotated to drive said first locker pin to rotatably penetrate through said first locker hole to said third locker hole in order to lock up a pivotal movement of said first connecting joint; and
   a second locker device coupled to said second connecting joint, wherein said second locker device has a second locker hole formed at said second joint member and a fourth locker hole formed at said fourth joint member, wherein said second locker device further comprises a second locker handle and a second locker pin extended from said second locker handle and arranged in such a manner that when said second and fourth joint members are pivotally moved to align said second locker hole with said fourth locker hole, said second locker handle is rotated to drive said second locker pin to rotatably penetrate through said second locker hole to said fourth locker hole to lock up a pivotal movement of said second connecting joint so as to lock up a folding movement of said tabletop.

2. The foldable table, as recited in claim 1, wherein said first joint member comprises two first connecting panels mounted to said first reinforcing member, wherein said third joint member comprises two third connecting panels mounted to said third reinforcing member, wherein said first connecting panels are also overlapped with said third connecting panels, wherein said first locker hole is formed at one of said first connecting panels, wherein said third locker hole is formed at one of said third connecting panels which is overlapped with said first connecting panel with said first locker hole.

3. The foldable table, as recited in claim 2, wherein said second joint member comprises two second connecting panels mounted to said second reinforcing member, wherein said fourth joint member comprises two fourth connecting panels mounted to said fourth reinforcing member, wherein said second connecting panels are also overlapped with said fourth connecting panels, wherein said second locker hole is formed at one of said second connecting panels, wherein said fourth locker hole is formed at one of said fourth connecting panels which is overlapped with said second connecting panel with said second locker hole.

4. The foldable table, as recited in claim 3, wherein each of said first connecting panels has a first base portion coupled to said first reinforcing member and a first head portion upwardly and inwardly extended from said first base portion, wherein each of said third connecting panels has a third base portion coupled to said third reinforcing member and a third head portion upwardly and inwardly extended from said third base portion, wherein said first pivot hole is formed at said first head portion of each of said first connecting panels, wherein said third pivot hole is formed at said third head portion of each of said third connecting panels, wherein said first pivot pin penetrates said first and third pivot holes such that said first and third joint members are pivotally coupled with each other.

5. The foldable table, as recited in claim 4, wherein each of said second connecting panels has a second base portion coupled to said second reinforcing member and a second head portion upwardly and inwardly extended from said second base portion, wherein each of said fourth connecting panels has a fourth base portion coupled to said fourth reinforcing member and a fourth head portion upwardly and inwardly extended from said fourth base portion, wherein said second pivot hole is formed at said second head portion of each of said second connecting panels, wherein said fourth pivot hole is formed at said fourth head portion of each of said fourth connecting panels, wherein said second pivot pin penetrates said second and fourth pivot holes such that said second and fourth joint members are pivotally coupled with each other.

6. A hinge arrangement for a foldable table which comprises first and third reinforcing members mounted along two longitudinal sides of a first tabletop panel, and second and fourth reinforcing members mounted along two longitudinal sides of a second tabletop panel, wherein said hinge arrangement comprises:
   a first connecting joint comprising a first pivot pin, a first joint member coupled to an inner end of said first reinforcing member and a third joint member coupled to an inner end of said third reinforcing member, wherein said first joint member has a first pivot hole, wherein said third joint member has a third pivot hole, wherein said first and third pivot holes are aligned that said first pivot pin penetrates through said first and third pivot holes to pivotally couple said first and third joint members, wherein said first and third joint members are pivotally coupled to pivotally couple said inner ends of said first and third reinforcing members;
   a second connecting joint comprising a second pivot pin, a second joint member coupled to an inner end of said second reinforcing member and a fourth joint member coupled to an inner end of said fourth reinforcing member, wherein said second joint member has a second pivot hole, wherein said fourth joint member has a fourth pivot hole, wherein said second and fourth pivot holes are aligned that said second pivot pin penetrates through said second and fourth pivot holes to pivotally couple said second and fourth joint members, wherein said second and fourth joint members are pivotally coupled to pivotally couple said inner ends of said second and fourth reinforcing members;
   a first locker device coupled to said first connecting joint, wherein said first locker device has a first locker hole formed at said first joint member and a third locker hole formed at said third joint member, wherein said first locker device further comprises a first locker handle and a first locker pin extended from said first locker handle and arranged in such a manner that when said first and third joint members are pivotally moved to align said first locker hole with said third locker hole, said first locker handle is rotated to drive said first locker pin to rotatably penetrate through said first locker hole to said third locker hole in order to lock up a pivotal movement of said first connecting joint; and
   a second locker device coupled to said second connecting joint, wherein said second locker device has a second locker hole formed at said second joint member and a fourth locker hole formed at said fourth joint member, wherein said second locker device further comprises a second locker handle and a second locker pin extended from said second locker handle and arranged in such a manner that when said second and fourth joint members are pivotally moved to align said second locker hole with said fourth locker hole, said second locker handle is rotated to drive said second locker pin to rotatably penetrate through said second locker hole to said fourth locker hole to lock up a pivotal movement of said second connecting joint.

7. The hinge arrangement, as recited in claim 6, wherein said first joint member comprises two first connecting panels for mounting to said first reinforcing member, wherein said third joint member comprises two third connecting panels for mounting to said third reinforcing member, wherein said first connecting panels are also overlapped with said third connecting panels, wherein said first locker hole is formed at one of said first connecting panels, wherein said third locker hole is formed at one of said third connecting panels which is overlapped with said first connecting panel with said first locker hole.

8. The hinge arrangement, as recited in claim 7, wherein said second joint member comprises two second connecting panels for mounting to said second reinforcing member, wherein said fourth joint member comprises two fourth connecting panels for mounting to said fourth reinforcing member, wherein said second connecting panels are also overlapped with said fourth connecting panels, wherein said second locker hole is formed at one of said second connecting panels, wherein said fourth locker hole is formed at one of said fourth connecting panels which is overlapped with said second connecting panel with said second locker hole.

9. The hinge arrangement, as recited in claim 8, wherein each of said first connecting panels has a first base portion coupled to said first reinforcing member and a first head portion upwardly and inwardly extended from said first base portion, wherein each of said third connecting panels has a third base portion coupled to said third reinforcing member and a third head portion upwardly and inwardly extended from said third base portion, wherein a first pivot hole is formed at said first head portion of each of said first connecting panels, wherein a third pivot hole is formed at said third head portion of each of said third connecting panels, wherein a first pivot pin penetrates said first and third pivot holes such that said first and third joint members are pivotally coupled with each other.

10. The hinge arrangement, as recited in claim 9, wherein each of said second connecting panels has a second base portion coupled to said second reinforcing member and a second head portion upwardly and inwardly extended from said second base portion, wherein each of said fourth connecting panels has a fourth base portion coupled to said fourth reinforcing member and a fourth head portion upwardly and inwardly extended from said fourth base portion, wherein a second pivot hole is formed at said second head portion of each of said second connecting panels, wherein a fourth pivot hole is formed at said fourth head portion of each of said fourth connecting panels, wherein a second pivot pin penetrates said second and fourth pivot holes such that said second and fourth joint members are pivotally coupled with each other.

11. The hinge arrangement, as recited in claim 6, wherein said second joint member comprises two second connecting panels for mounting to said second reinforcing member, wherein said fourth joint member comprises two fourth connecting panels for mounting to said fourth reinforcing member, wherein said second connecting panels are also overlapped with said fourth connecting panels, wherein said second locker hole is formed at one of said second connecting panels, wherein said fourth locker hole is formed at one of said fourth connecting panels which is overlapped with said second connecting panel with said second locker hole.

12. A method of unfolding a foldable table, comprising the steps of:
   (a) pivotally unfolding first and second tabletop panels to form a tabletop by the steps of:
   (a.1) providing first and second joint members at said first tabletop panel, and providing third and fourth joint members at said second tabletop panel, wherein said first and second joint members have first and second pivot holes respectively, wherein said third and fourth joint members have third and fourth pivot holes respectively;
   (a.2) penetrating a first pivot pin through said first and third pivot holes of said first and third joint members when said first and third pivot holes are aligned with each other; and
   (a.3) penetrating a second pivot pin through said second and third pivot holes of said first and third joint members when said first and third pivot holes are aligned with each other, such that said first and second tabletop panels are pivotally coupled with each in order to pivotally unfold with respect to said first and second pivot pins; and
   (b) locking up a folding movement of said tabletop by the steps of:
   (b.1) providing a first locker hole, a second locker hole, a third locker hole, and a fourth locker hole at said first joint member, said second joint member, said third joint member, and said fourth joint member respectively, wherein said first and third locker holes are aligned with each other and said second and fourth locker holes are aligned with each other when said first and second tabletop panels are unfolded;
   (b.2) driving a first locker pin to rotatably penetrate through said first locker hole to said third locker hole when said first and third locker holes are aligned with each other in order to lock up a pivotal movement between said first and third joint members; and
   (b.3) driving a second locker pin to rotatably penetrate through said second locker hole to said fourth locker hole when said second and fourth locker holes are aligned with each other in order to lock up a pivotal movement between said second and fourth joint members so as to lock up said folding movement of said tabletop.

13. The method as recited in claim 12 wherein, in the steps (b.2) and (b.3), said first and second locker pins are driven to rotate by a first locker handle and a second locker handle respectively, wherein said first and second locker pins are extended from said first and second locker handles respectively.

14. The method, as recited in claim 13, wherein the step (a.1) further comprises the steps of:
   (a.1.1) mounting two first connecting panels of said first joint member to a first reinforcing member, and mounting two third connecting panels of said third joint member to a third reinforcing member, wherein said first and third reinforcing members are respectively mounted along two longitudinal sides of said first tabletop panel at a bottom surface thereof, wherein said first connecting panels are overlapped with said third connecting panels;
   (a.1.2) mounting two second connecting panels of said second joint member to a second reinforcing member, and mounting two fourth connecting panels of said fourth joint member to a fourth reinforcing member, wherein said second and fourth reinforcing members are respectively mounted along two longitudinal sides of said second tabletop panel at a bottom surface thereof, wherein said second connecting panels are overlapped with said fourth connecting panels;
   (a.1.3) providing said first locker hole at one of said first connecting panels, and providing said third locker hole at one of said third connecting panels which is overlapped with said first connecting panel with said first locker hole; and
   (a.1.4) providing said second locker hole at one of said second connecting panels, and providing said fourth locker hole at one of said fourth connecting panels which is overlapped with said second connecting panel with said second locker hole.

15. The method, as recited in claim 14, wherein each of said first connecting panels has a first base portion coupled to said first reinforcing member and a first head portion upwardly and inwardly extended from said first base portion, wherein each of said third connecting panels has a third base portion coupled to said third reinforcing member and a third head portion upwardly and inwardly extended from said third base portion, wherein said first pivot hole is formed at said first head portion of each of said first connecting panels, wherein said third pivot hole is formed at said third head portion of each of said third connecting panels, wherein said first pivot pin penetrates said first and third pivot holes such that said first and third joint members are pivotally coupled with each other.

16. The method, as recited in claim 15, wherein each of said second connecting panels has a second base portion coupled to said second reinforcing member and a second head portion upwardly and inwardly extended from said second base portion, wherein each of said fourth connecting panels has a fourth base portion coupled to said fourth reinforcing member and a fourth head portion upwardly and inwardly extended from said fourth base portion, wherein said second pivot hole is formed at said second head portion of each of said second connecting panels, wherein said fourth pivot hole is formed at said fourth head portion of each of said fourth connecting panels, wherein said second pivot pin penetrates said second and fourth pivot holes such that said second and fourth joint members are pivotally coupled with each other.

17. The method, as recited in claim 16, further comprising a step of pivotally folding first and second leg frames from said bottom surfaces of said first and second tabletop panels respectively.

* * * * *